United States Patent

Crumb et al.

[11] Patent Number: 5,214,917
[45] Date of Patent: Jun. 1, 1993

[54] CENTER VALVE MASTER CYLINDER WITH SELF-ADJUSTING COMPENSATION CENTER VALVE

[75] Inventors: Donald A. Crumb; Robert K. Wilson, both of Granger, Ind.

[73] Assignee: Allied-Signal Inc., Morristown, N.J.

[21] Appl. No.: 944,615

[22] Filed: Sep. 14, 1992

[51] Int. Cl.⁵ ............................................. B60T 11/20
[52] U.S. Cl. ........................................ 60/562; 60/589
[58] Field of Search ................ 60/533, 562, 581, 587, 60/589; 92/13.3

[56] References Cited

U.S. PATENT DOCUMENTS

| | | | |
|---|---|---|---|
| 4,240,258 | 12/1980 | Angert et al. | 60/589 |
| 4,330,995 | 5/1982 | Miyakawa et al. | 60/589 |
| 5,159,871 | 11/1992 | Kehl | 60/587 |
| 5,161,375 | 11/1992 | Crumb et al. | 60/562 |

FOREIGN PATENT DOCUMENTS 0050842  5/1981  Japan ..................... 60/562

Primary Examiner—Thomas E. Denion
Attorney, Agent, or Firm—Larry J. Palguta; William N. Antonis

[57] ABSTRACT

The master cylinder (30) includes primary and secondary pistons (42, 52) each of which has a center compensation valve member (44, 60). An abutment member or pin (38, 40) extends across a bore (36) of the master cylinder (30) adjacent ends of each of the pistons (42, 52) and the pins (38, 40) are each engaged by shafts (45, 64) of the spring biased valve members (44, 60) of the primary and secondary pistons (42, 52). An output rod (43) of a vacuum booster (41) to which the master cylinder (30) is attached disposes the primary piston (52) slightly spacedapart from the respective pin (40) in an at-rest position. The primary piston (52) includes a self-adjusting compensation center valve seat (70) located within the primary piston (52), the valve seat (70) sealingly and slidingly movable relative to the primary piston (52). The valve seat (70) extends through a rear opening (59) of the piston (52) to engage the respective pin (40). The engagement of the valve seat (70) and shaft (64) of the valve member (60) ensures that the valve head (62) is always positioned a predetermined distance (C) from the valve seat (70) in the at-rest position of the primary piston (52). The brake pedal "feel" can be closely controlled to minimize soft pedal feel during brake actuation by minimizing stackup tolerances within the master cylinder (30) such that the valve member (60) of the primary piston (52) closes very quickly.

12 Claims, 3 Drawing Sheets

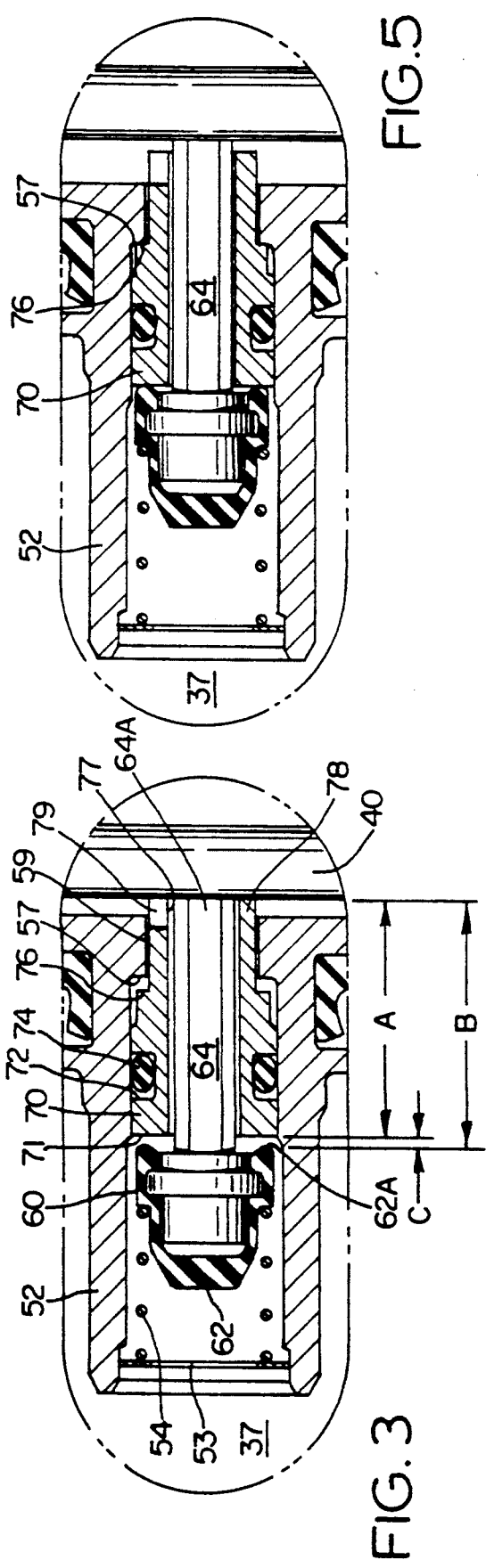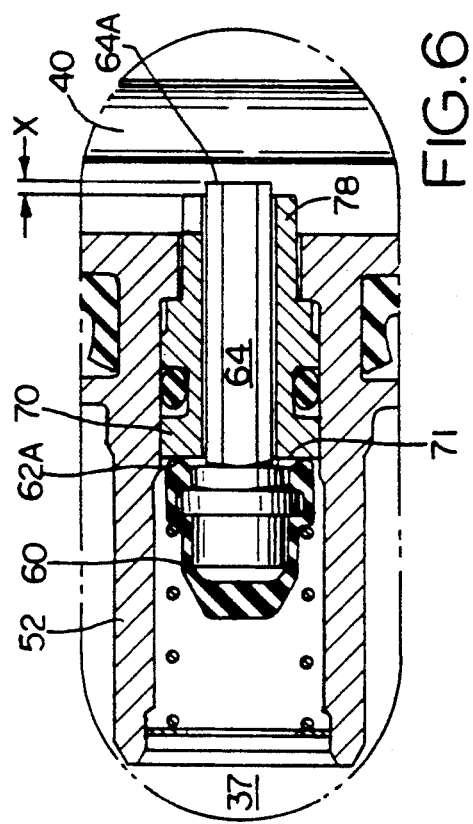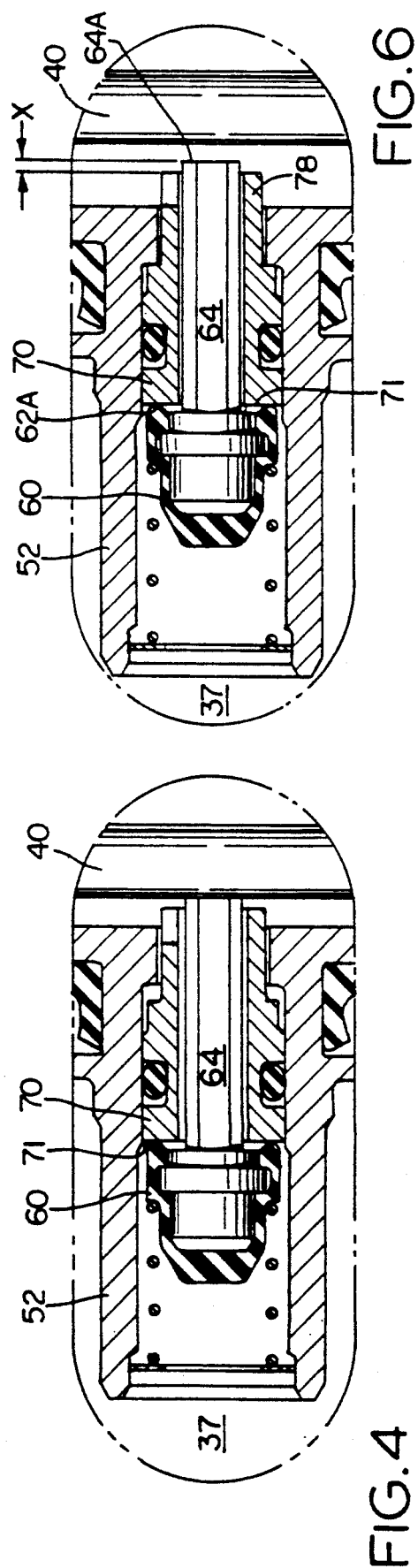

CENTER VALVE MASTER CYLINDER WITH SELF-ADJUSTING COMPENSATION CENTER VALVE

The present invention relates generally to a tandem master cylinder having center compensation valves, and in particular to a master cylinder having a self-adjusting compensation center valve for the primary piston.

Master cylinders have been provided previously with center compensation valves. FIG. 1 illustrates a tandem master cylinder having center compensation valves for the primary and secondary pistons 10 and 20. Master cylinder is attached to a vacuum brake booster 2 having an output rod 3 which positions the primary piston 10 a short distance from the abutment member or pin 4. Secondary piston 20 abuts the pin 5. In the illustrated at-rest position, valve member 6 located within primary piston 10 is in an open position, as is also valve member 7 of the secondary piston 20. Because this type of master cylinder does not utilize a caged primary spring instead of the illustrated primary spring 8, the total compensation loss for the master cylinder is the sum of the primary and secondary compensation travel distances. The tolerance of the secondary compensation travel is smaller than the tolerance of the primary compensation travel. This is because the secondary piston and the valve member 7 rest against the pin 5 in the released position, while the primary piston 10 does not rest against the pin 4. Thus, there are only two dimensions that control the tolerance of the secondary compensation travel. However, there are as many as six dimensions that control the tolerance of the compensation travel of valve member 6. It is highly desirable to provide a master cylinder which maintains tight control on the travel tolerance of the secondary piston 20 and associated valve member 7 and which reduces the tolerance of the primary piston compensation travel to the same value as that of the secondary compensation travel. Thus, the overall tolerance of the sum of the compensation travels of the master cylinder would be significantly reduced.

The present invention provides solutions to the above problems by providing in a master cylinder having at least one piston with a center compensation valve and a valve member of the valve abutting stationary abutment means located within a bore of the master cylinder, the improvement comprising the valve having an adjustable valve seat located sealingly and slidingly within said piston, the valve seat extending through a rear opening of said piston and engaging said abutment means in an at-rest position of said piston, the valve member having a shaft extending slidably through said adjustable valve seat and engaging the abutment means in the at-rest position, the valve member biased by resilient means connected with said piston, so that in the at-rest position said valve member is positioned such that fluid may flow through said piston, and during actuation of said piston the valve member sealingly engages the adjustable valve seat to prevent fluid flow through said piston.

One way of carrying out the invention is described in detail below with reference to the drawings which illustrate an embodiment in which:

FIG. 3 is an enlarged view of the circled portion of FIG. 2;

FIG. 4 is an illustration of the circled portion of FIG. 2 when the master cylinder is being actuated;

FIG. 5 is an illustration of the circled portion of FIG. 2 upon further actuation of the master cylinder; and FIG. 6 is an illustration of the circled portion of FIG. 2 when the primary piston is in a stroked position.

Figure 1:
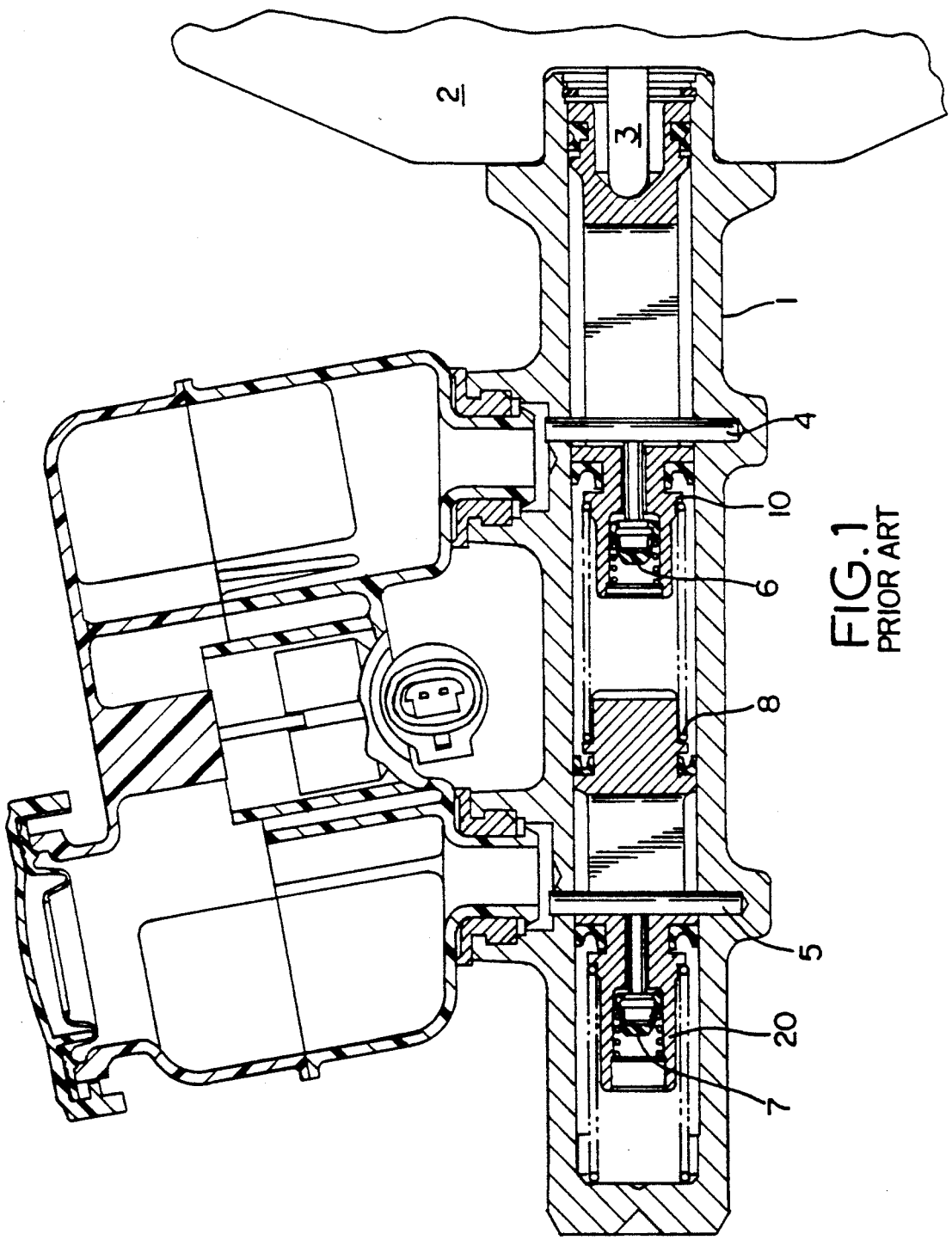
FIG. 1 is an illustration of a prior art type of tandem master cylinder having center compensation valves in the primary and secondary pistons.
Figure 2:
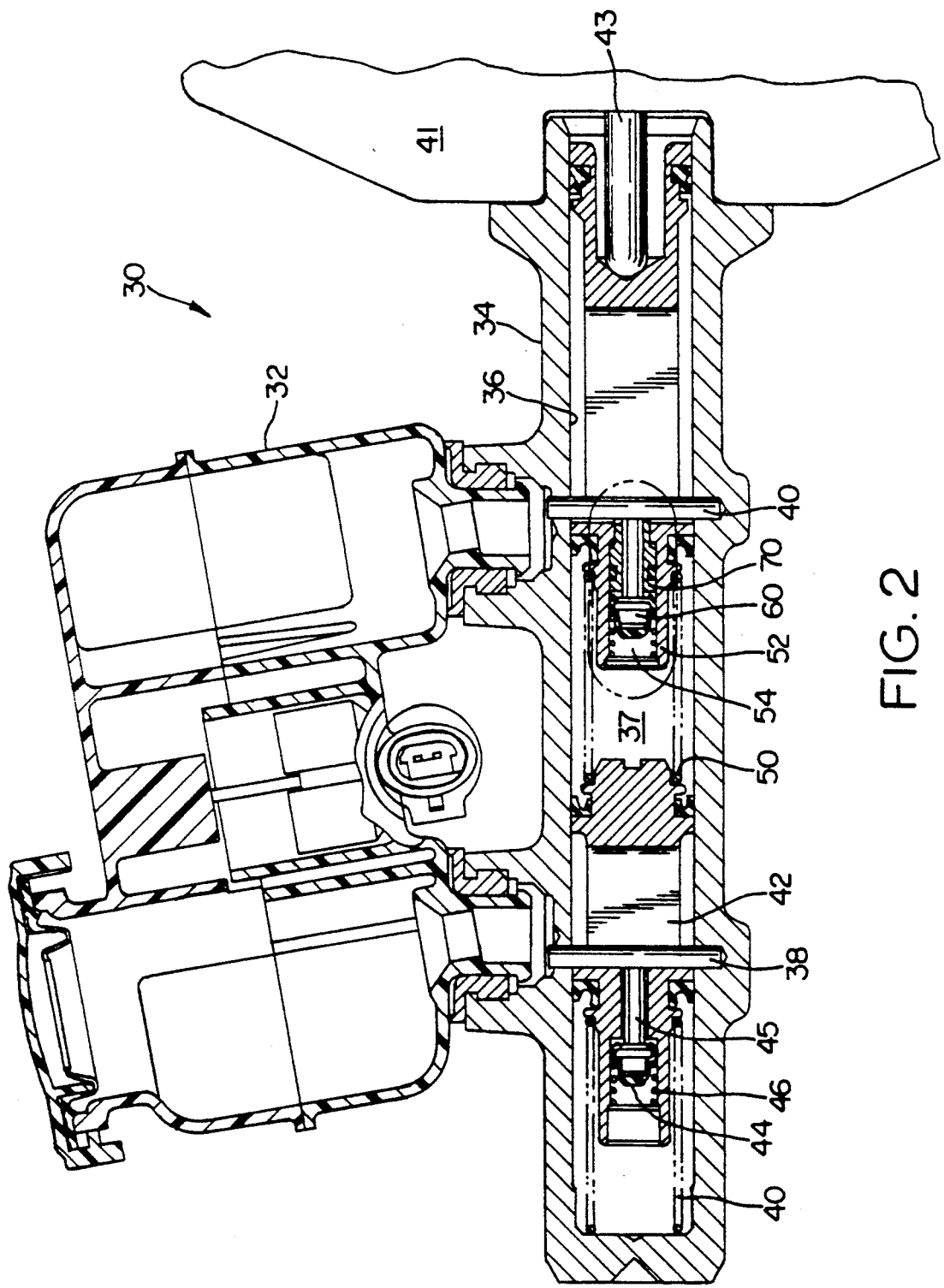
FIG. 2 is an illustration of the master cylinder in accordance with the present invention.

Referring to FIG. 2, a tandem master cylinder with center compensation valves in the primary and secondary pistons is referenced generally by numeral 30. Master cylinder 30 includes reservoir 32, body 34 having bore 36, abutment members or pins 38 and 40, and secondary piston 42 having poppet or valve member 44 and shaft 45 biased by spring 46. Secondary piston 42 is biased by spring 48 while primary piston 52 is biased by spring 50. Primary piston 52 includes stepped through opening 54 which includes therein poppet or valve member 60, and adjustable valve seat 70. Master cylinder 30 is attached to vacuum brake booster 41 having output rod 43 which engages primary piston 52 and positions piston 52 in an at-rest position slightly spaced apart from pin 40. Referring to FIG. 3, primary piston 52 includes snap ring 53 which positions spring 54 for engagement with valve member head 62. Valve member 60 includes head 62 and fluted shaft 64 which engages pin 40 in an at-rest position of primary piston 52. Through opening 54 includes shoulder 57. Valve seat 70 includes thereabout groove 72 which provides a seat for seal 74, and has a stepped exterior profile with shoulder 76. Shaft or end extension 78 of valve seat 70 extends through rear opening 59 of primary piston 52 so that end extension 78 engages pin 40 in an at-rest position of primary piston 52. Valve seat 70 further includes lateral opening 79 for enhancing fluid flow through the through opening 77 of valve seat 70 and to a not shown compensation opening in master cylinder body 34.

As illustrated in FIG. 3, the valve compensation opening, comprising the distance between head 62 and valve seat surface 71 of valve seat 70 comprises the distance C which is controlled by only two dimensions i.e. dimension A which is the length of valve seat 70 and dimension B which is the length of shaft 64 from rear end 64A to sealing surface 62A of valve head 62. In the at-rest position illustrated in FIGS. 2 and 3, fluid within primary pressure chamber 37 may flow through opening 77 as a result of sealing surface 62A being spaced the distance C from valve seat surface 71, and through lateral opening 79 to the not shown compensation opening in the master cylinder body. When vacuum brake booster 41 is actuated initially by the vehicle operator pressing a not shown brake pedal, output rod 43 displaces piston 52 an initial distance such that primary piston 52 and valve seat 70 are displaced away from pin 40 as illustrated in FIG. 4. This causes spring biased valve member 60 to engage valve seat surface 71 and close off fluid communication between primary chamber 37 of the master cylinder and reservoir 32. Further movement of primary piston 52 as a result of a displacement of output rod 43 by vacuum brake booster 41, effects an increase or building of fluid pressure in primary pressure chamber 37 which urges or displaces adjustable center valve seat 70 toward the right in FIG. 5 so that shoulder 76 engages shoulder 57 of primary piston 52. This places valve seat 70 and valve head 62 in position for release during a return stroke. FIG. 6 illustrates primary piston 52 in a stroked position whereby fluted shaft 64 of valve member 60 and extension 78 of valve member 70 are each disengaged and spaced apart respective distances from pin 40. Note that the distance X which represents the distance between end extension 78 and the rear end 64A of shaft 64 is equal to the distance C so that when brake actuation has been terminated and the primary piston is returning toward a release position during the return stroke, shaft 64 will initially re-engage pin 40 before extension 78 engages pin 40 and sealing surface 62A of valve member 60 moves away from valve seat surface 71 and permits compensation fluid flow from primary pressure chamber 37 to reservoir 32.

The present invention provides a tandem master cylinder with a center compensation valve that eliminates several of the tolerances typically present in the stackup of compensation travel distances. The tolerance of the primary compensation travel is reduced to the same value as the tolerance for the secondary compensation travel, resulting in an ability to closely control and reduce the soft pedal "feel" present during an initial actuation of the brakes so that the vehicle operator experiences much quicker a firm brake pedal "feel".

We claim:

1. In a master cylinder having at least one piston with a center compensation valve and a valve member of the valve abutting stationary abutment means located within a bore of the master cylinder, the improvement comprising the valve having an adjustable valve seat located sealingly and slidingly within said piston, the valve seat extending through a rear opening of said piston and engaging said abutment means in an at-rest position of said piston, the valve member having a shaft extending slidably through said adjustable valve seat and engaging the abutment means in the at-rest position, the valve member biased by resilient means connected with said piston, so that in the at-rest position said valve member is positioned such that fluid may flow through said piston, and during actuation of said piston the valve member sealingly engages the adjustable valve seat to prevent fluid flow through said piston.

2. The master cylinder in accordance with claim 1, wherein the piston comprises a stepped through opening having a shoulder located adjacent the rear opening, said adjustable valve seat includes a stepped exterior having a complementary shaped shoulder located adjacent the shoulder of the piston, the valve member and adjustable valve seat able to move axially relative to the piston during actuation of the master cylinder so that said shoulders engage.

3. The master cylinder in accordance with claim 2, wherein the adjustable valve seat includes a groove thereabout receiving therein a seal which sealingly engages a surface of the through opening of the piston.

4. The master cylinder in accordance with claim 3, wherein the valve seat includes a through opening and a head of said valve member comprises a seal which engages a radial surface of said adjustable valve seat to prevent fluid flow through the through opening of the valve seat.

5. The master cylinder in accordance with claim 4, wherein an end of the valve seat which engages the abutment means comprises at least one lateral opening to provide for fluid flow through said through opening of the valve seat and to a compensation opening in said master cylinder.

6. The master cylinder in accordance with claim 1, wherein the shaft comprises a fluted shaft for fluid flow through the adjustable valve seat.

7. In a master cylinder having a pair of pistons each with a center compensation valve and a valve member of each valve abutting respective stationary abutment means located within a bore of the master cylinder, the improvement comprising the valve of one of said pistons having an adjustable valve seat located sealingly and slidingly within the one piston and extending through a rear opening of said one piston to engage the respective abutment means in an at rest position of said one piston, the valve member of the one piston having a shaft extending slidably through said adjustable valve seat and engaging the respective abutment means in the at-rest position, the valve member of the one piston biased by resilient means connected with said one piston, so that in the at-rest position the valve member is positioned such that fluid may flow through said one piston.

8. The master cylinder in accordance with claim 7, wherein the one piston comprises a stepped through opening having a shoulder located adjacent the rear opening, said adjustable valve seat includes a stepped exterior having a complementary shaped shoulder located adjacent the shoulder of the one piston, the valve member and adjustable valve seat of the one piston able to move axially relative to the one piston during actuation of the master cylinder so that said shoulders engage.

9. The master cylinder in accordance with claim 8, wherein the adjustable valve seat includes a groove thereabout receiving therein a seal which sealingly engages a surface of the through opening of the one piston.

10. The master cylinder in accordance with claim 9, wherein the valve seat includes a through opening and a head of said valve member of the one piston comprises a seal which engages a radial surface of said adjustable valve seat to prevent fluid flow through the through opening of the valve seat.

11. The master cylinder in accordance with claim 10, wherein an end of the valve seat which engages the respective abutment means comprises at least one lateral opening to provide for fluid flow through said through opening of the valve seat and to a compensation opening in said master cylinder.

12. The master cylinder in accordance with claim 7, wherein the shaft comprises a fluted shaft for fluid flow through the adjustable valve seat.

* * * * *